(Specimens.)
I. HERSEY & M. R. CONLEY.
TREATMENT OF ORE.
No. 378,588. Patented Feb. 28, 1888.
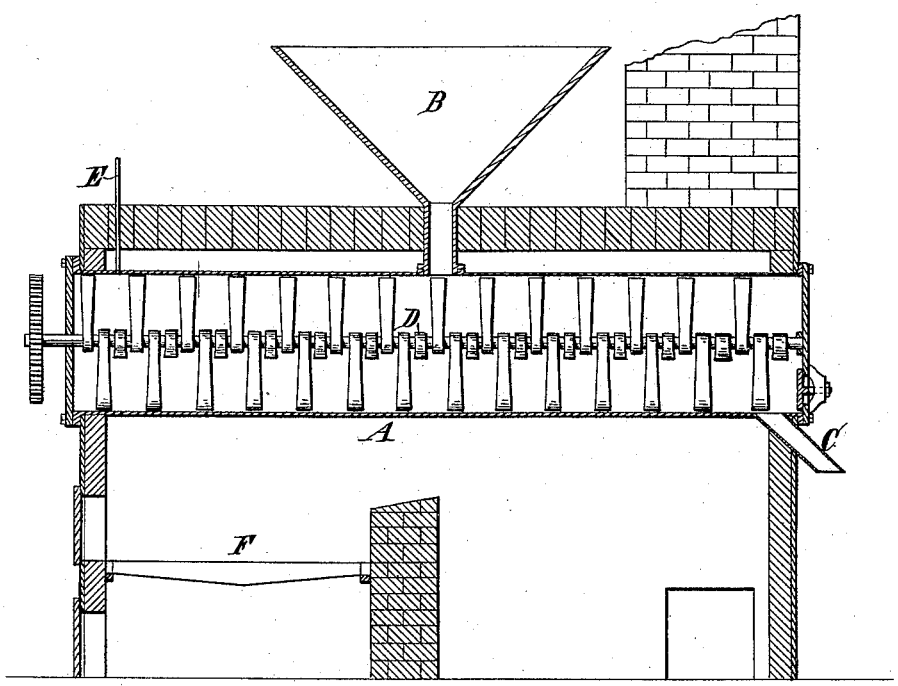

UNITED STATES PATENT OFFICE.

IRA HERSEY, OF NEW YORK, AND MICHAEL R. CONLEY, OF BROOKLYN, ASSIGNORS TO WILLIAM BELL, OF NEW YORK, N. Y.

TREATMENT OF ORE.

SPECIFICATION forming part of Letters Patent No. 378,588, dated February 28, 1888.

Application filed September 9, 1886. Serial No. 213,067. (Specimens.)

*To all whom it may concern:*

Be it known that we, IRA HERSEY, of New York, county of New York, and State of New York, and MICHAEL R. CONLEY, of Brooklyn, in Kings county and the State of New York, have invented a certain new and useful Improvement in the Treatment of Ore, of which the following is a specification.

Our improvement relates particularly to the treatment of a kind of ore known as "magnetic" iron ore. The object of the improvement is to deoxidize said ore to a large extent and then so pack the product with a carbonaceous material that it may be protected against influences tending to reoxidize it, and so that the remaining oxygen in the ore will combine with the carbon in the carbonaceous material to form a carbonic oxide under further treatment.

We will describe the improvement in detail, and then point out the novel features in claims.

The accompanying drawing is a vertical section of a retort which we may employ.

We take ore in a granulated state, preferably "sea sand" ore, and, having first separated it from titanium, sand, and earthy matters, mix with it sufficient carbon, preferably powdered, to practically deoxidize the ore at a low temperature—say about twenty-five parts, by weight, of charcoal or other suitable carbon. The ore and carbon so mixed we place in a closed retort heated by a furnace.

In the drawing, A designates a retort supported in suitable masonry and provided with a delivery-hopper, B, a discharge-chute, C, a rotary stirrer, D, and a gas-vent pipe, E. The retort is closed at its ends. Below it is a furnace-grate, F. After having been placed in the retort, the mixed ore and carbon are subjected to a heat which is insufficient to mat or melt the metal in the ore—say about 1,000° to 1,500° Fahrenheit—and to preserve the magnetic iron. While being heated the mixture is constantly stirred. The stirring of the particles of ore while in the retort is advantageous, because the particles are thus prevented from agglomerating. The heating is preferably continued until the mixture has been brought to a red heat, whereby all the particles of ore will be uniformly relieved of oxygen. A ton of sea-sand ore contains about twenty-eight per cent. of oxygen. The heating and stirring will eliminate about fifteen to twenty per cent. of the oxygen. By this means from about eight per cent. to about thirteen per cent. of oxygen is left in the iron. We prefer to leave this amount rather than subject the iron in the retort to a higher degree of heat, which would be necessary to eliminate it. When the ore has been sufficiently freed from its oxygen, the iron is removed from the retort, and when it is sufficiently cooled we mix with it about five per cent., by weight, of pitch or other suitable carbonaceous material in a liquid state. By this means the particles of iron are packed so that atmospheric air cannot reach them and reoxidation take place.

If pitch or other carbonaceous adhesive material be used, the iron will, when mixed with it, become carbureted.

The mixture of iron and carbonaceous adhesive material may be pressed into bricks, blocks, or lumps in any suitable manner. In this condition the iron may be shipped as an article of commerce. Our iron thus prepared may be treated in a furnace or crucible in any usual or well known manner for the manufacture of steel.

What we claim as our invention, and desire to secure by Letters Patent, is—

1. As a new composition of matter, granular iron ore having eliminated from it all but a small amount of the oxygen—say about eight to thirteen per cent.—being mixed with liquid carbonaceous material, and the whole formed into bricks, blocks, or lumps, substantially as and for the purpose specified.

2. The process of treating granular iron ore, consisting in eliminating from it all but a small amount of the oxygen—say about eight to thirteen per cent.—by treating it in a closed retort, then mixing with the product carbonaceous material in a liquid state, and ultimately pressing it into bricks, blocks, or lumps, substantially as specified.

IRA HERSEY.
M. R. CONLEY.

Witnesses:
EDWIN H. BROWN,
CHAS. T. WARD.